Oct. 23, 1962 — H. T. HOLSMAN — 3,059,380
BLOCK WALL REINFORCEMENT
Filed Sept. 28, 1959

Henry T. Holsman,
INVENTOR.

BY HIS ATTORNEYS.

Harris, Kiech, Russell & Kern

United States Patent Office 3,059,380
Patented Oct. 23, 1962

3,059,380
BLOCK WALL REINFORCEMENT
Henry T. Holsman, 112 E. De la Guerra,
Santa Barbara, Calif.
Filed Sept. 28, 1959, Ser. No. 842,979
1 Claim. (Cl. 50—492)

The present invention relates in general to a reinforcement for structures formed of or including cementitious materials, such as concrete, mortar, or the like, and, more particularly, to a reinforcement which is adjustable so that it may be utilized in structures of different dimensions, a primary object of the invention being to provide a simple and inexpensive, but nevertheless effective, reinforcement which is easily adjustable.

The invention is of particular utility as a reinforcement to be set in mortar between courses of a block wall, such as a brick wall, a concrete block wall, or the like, and will be considered in such connection herein for convenience of disclosure. However, it will be understood that the reinforcement of the invention is susceptible of more general use in connection with cementitious materials.

Considering the invention more specifically now, an important object thereof is to provide a reinforcement which includes two parallel longitudinal members and parallel connectors extending between and rigidly secured at their ends to the longitudinal member, preferably by welding, the connectors being bendable to provide for varying the spacing between the longitudinal members by a parallelogram motion. Normally, the reinforcement is manufactured in a width to fit within a block wall of a predetermined minimum thickness. For a thicker block wall, the width of the reinforcement may readily be increased by pulling the longitudinal members apart, the connectors simply bending to permit this, which is an important feature of the invention.

Another object is to provide bendable anchors welded to the longitudinal members and extending from each of the longitudinal members toward the other, such anchors being useful in holding the reinforcement in place relative to a wall of hollow concrete blocks, for example. A related object is to make the anchors integral with the connectors.

Still more particularly, an important object of the invention is to provide a reinforcement which includes two parallel longitudinal members and a zigzag member of bendable material having longitudinally spaced crests welded to one of the longitudinal members and having intervening longitudinally spaced crests welded to the other longitudinal member, the crests being connected to adjacent crests by parallel connector portions which form the connectors mentioned and by parallel anchor portions which are rendered discontinuous by cutting them in half to provide the anchors mentioned.

Another object is to provide a reinforcement wherein the longitudinal members and the zigzag member are all formed of common wire, whereby the components of the reinforcement may be welded together readily by passing them between simple welding rolls.

The foregoing objects, advantages, features and results of the invention, together with various other objects, advantages, features and results thereof which will be evident to those skilled in the art of reinforcing cementitious materials in the light of this disclosure, may be attained with the exemplary embodiments of the invention described in detail hereinafter and illustrated in the accompanying drawing, in which.

Figure 1:
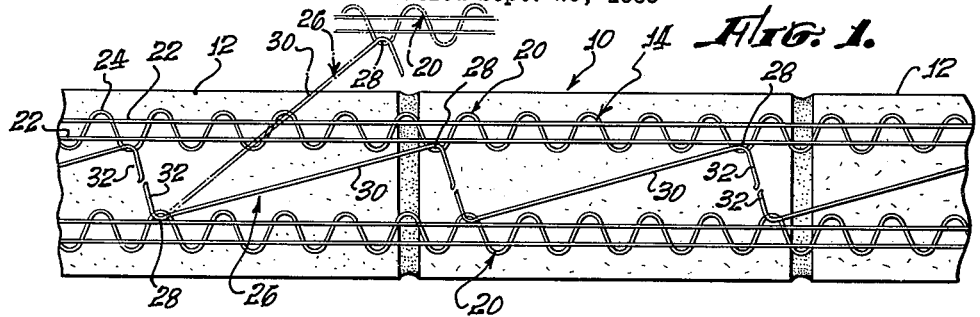
FIG. 1 is a plan view of a reinforcement of the invention in connection with a straight block wall.
Figure 2:
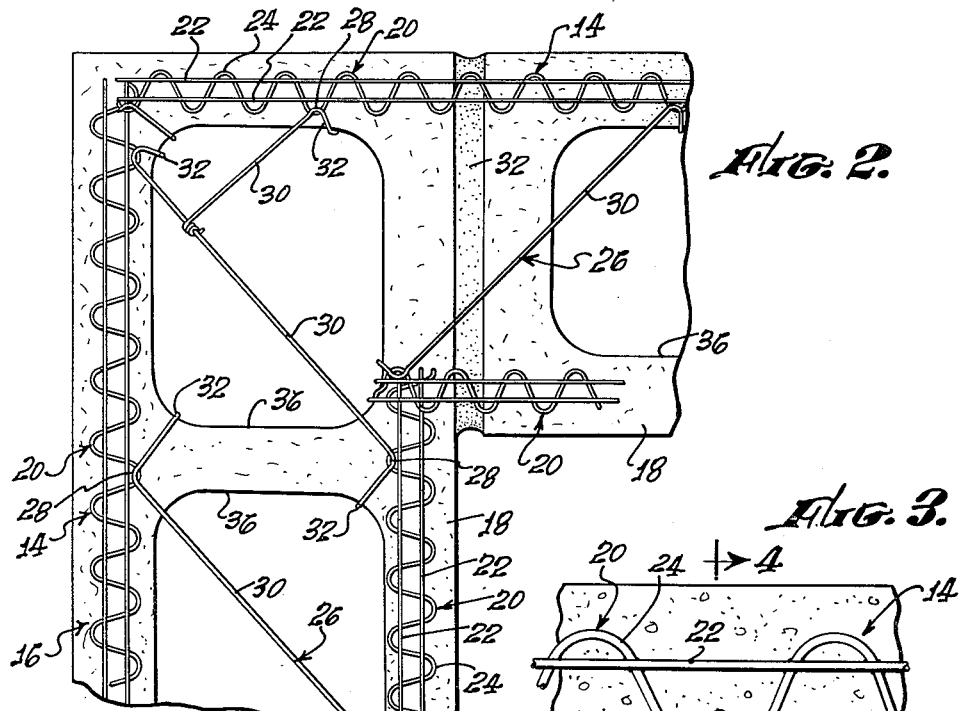
FIG. 2 is a plan view of the reinforcement of the invention in use at a corner of a thicker block wall of hollow concrete blocks.

Referring to FIG. 1 of the drawing, the numeral 10 designates a straight block wall composed of blocks 12 between courses of which is disposed a reinforcement 14 of the invention. In FIG. 2, the numeral 16 designates a block wall corner composed of hollow concrete blocks 18 between courses of which two of the reinforcements 14 are adapted to be disposed.

Considering the reinforcement 14 of the invention in more detail, it includes two longitudinal members 20 each of which is shown as comprising two longitudinal stringers 22 and a generally sinusoidal member 24 secured together. Preferably, the stringers 22 and the sinusoidal member 24 of each longitudinal member 20 are formed of common wire and are welded together at their intersections.

The reinforcement 14 also includes a zigzag member 26 of common wire having longitudinally spaced crests 28 welded to one of the longitudinal members 20 and having intervening longitudinally spaced crests 28 welded to the other longitudinal member 20. Each crest 28 is connected to one of the crests adjacent thereto by a relatively long connector or connector portion 30 of the zigzag member 26, and each crest 28 is connected to the other crest adjacent thereto by a shorter anchor portion which is rendered discontinuous by cutting it in two substantially at its midpoint to form two anchors 32 each extending toward the opposite longitudinal member 20. The connectors 30 are all parallel and the anchor portions forming the anchors 32 are all parallel, the connectors and the anchor portions being transversely disposed relative to each other and, in the construction illustrated, being approximately perpendicular to each other.

Figure 3:
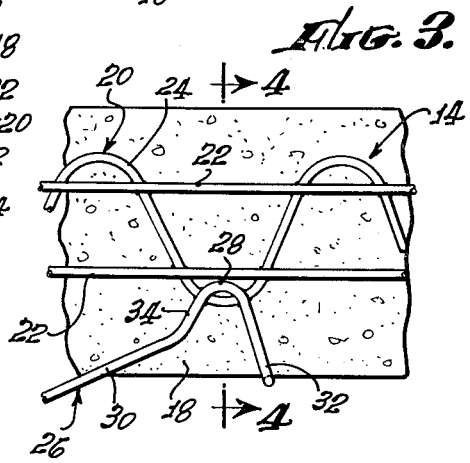
FIG. 3 is a fragmentary plan view similar to portions of FIG. 2, but showing a slightly modified embodiment of the invention.

The reinforcement 14 may be manufactured readily by feeding the stringers 22 and the sinusoidal members 24 of the longitudinal members 20 and the zigzag member 26 between welding rolls simultaneously in the overlapping relation shown, whereas the entire assembly is welded together in one operation. Subsequently, the anchor portions of the zigzag member 26 are cut to form the anchors 32. Thus, the reinforcement 14 may be manufactured very simply and economically. In FIGS. 1 and 2 of the drawing, the connectors 30 and anchors 32 are shown as formed by simply bending the zigzag member 26 through approximately 90° at each crest 28. FIG. 3 of the drawing shows a connector 30 and an anchor 32 of the zigzag member 26 formed with somewhat of a loop 34 at the corresponding crest 28. Such loop 34 provides a more desirable overlap with the corresponding longitudinal member 20 for welding purposes.

Normally, the reinforcement 14 is provided in a width to fit a certain minimum thickness block wall, such as the block wall 10 shown in FIG. 1 of the drawing. Whenever a thicker block wall is encountered, the width of the reinforcement 14 may be correspondingly increased by simply pulling the longitudinal members 20 apart, the connectors 30 bending adjacent the crests 28 to permit this. The connectors 30 and the longitudinal members 20 form a parallelogram linkage so that the longitudinal members remain parallel as the spacing therebetween is increased in this manner, an increased spacing between the longitudinal members being shown in phantom in FIG. 1 of the drawing and also being shown in FIG. 2 thereof. Since the zigzag member 26 is made of common wire, the connectors 30 bend readily adjacent the crests 28 to permit the width expansion described.

As is characteristic of the parallelogram linkage formed by the longitudinal members 20 and the connectors 30, the longitudinal members 20 are displaced longitudinally relative to each other upon increasing the spacing therebetween. Consequently, when two of the reinforcements 14 are disposed end to end, not shown, in a straight block wall such as the wall 10, the longitudinal members 20 of the two reinforcements 14 abut at points spaced apart longitudinally of the wall to provide a reinforcement overlap. This same relative longitudinal displacement of the longitudinal members 20 upon lateral expansion of the reinforcements 14 results in proper interfitting of two of the reinforcements 14 in the wall corner 16, as will be apparent from FIG. 2 of the drawing.

Considering the function of the anchors 32, these may be utilized in various ways to secure the reinforcement 14 in place. For example, as shown in FIG. 2, the anchors 32 may be bent downwardly into openings 36 in the concrete blocks 18 to secure each reinforcement 14 in place. In actual practice, each reinforcement is preferably expanded laterally to an excessive degree by permanent bending deformation of the connectors 30 at the crests 28. The longitudinal members 20 are then displaced toward each other sufficiently to cause the anchors 32 to extend over the openings 36, but not enough to produce permanent bending deformation of the connectors 30 in the reverse direction. Thereupon, the anchors 32 are bent downwardly into the openings 36 and the longitudinal members 20 are released, the inherent resilience of the zigzag member 26 then holding the downwardly bent portions of the anchors 32 firmly against the sides of the openings 36 to positively key the reinforcements 14 in place while mortar is spread thereover.

It will be apparent from the foregoing that forming the connectors 30 from the single zigzag member 26 achieves two important results. First, it greatly facilitates manufacture since it is a simple operation to weld the stringers 22 and the sinusoidal members 24 to each other and to the single, continuous zigzag member 26. Secondly, the use of the zigzag member 26 results in the provision of the anchors 32, which may be utilized as shown in and described in connection with FIG. 2, or otherwise.

Figure 4:
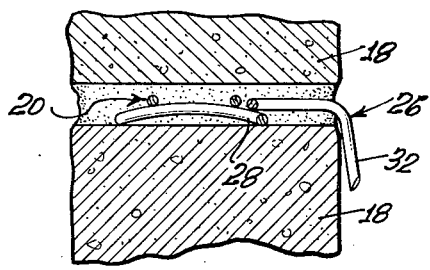
FIG. 4 is a sectional view taken along the arrowed line 4—4 of FIG. 3.

As shown in FIG. 4 of the drawing, it will be understood that the reinforcement 14 of the invention may be made self furring. For example, this may be accomplished readily by offsetting the crests of the sinusoidal members 24 laterally from the plane of the reinforcement.

Although exemplary embodiments of the invention have been disclosed herein for purposes of illustration, it will be understood that various changes, modifications and substitutions may be incorporated in such embodiments without departing from the spirit of the invention as defined by the claim which follows.

I claim:

In a reinforcement for cementitious materials, the combination of:

(a) two parallel longitudinal members initially having a predetermined lateral spacing therebetween in the plane thereof;

(b) a zigzag member of manually bendable wire in the plane of said longitudinal members and having alternate, longitudinally spaced crests welded to one of said longitudinal members and having intervening, longitudinally spaced crests welded to the other of said longitudinal members;

(c) said crests being connected to adjacent crests by parallel wire connector members which form parts of said wire zigzag member and which are manually bendable by moving said longitudinal members toward and away from each other in the plane thereof to vary said initial predetermined lateral spacing between said longitudinal members;

(d) said crests having formed integrally therewith parallel wire anchors which also form parts of said wire zigzag member and each of which extends laterally inwardly in the plane of said longitudinal members from one of said longitudinal members toward the other of said longitudinal members and at least partially spans any space between said longitudinal members;

(e) said wire anchors on each of said longitudinal members respectively being aligned with said wire anchors on the other of said longitudinal members with said initial predetermined lateral spacing between said longitudinal members;

(f) the inner ends of said wire anchors on each of said longitudinal members respectively substantially abutting the inner ends of said wire anchors on the other of said longitudinal members with said initial predetermined lateral spacing between said longitudinal members;

(g) said wire anchors being generally perpendicular to said wire connector members with said initial predetermined lateral spacing between said longitudinal members; and (h) said wire anchors being bendable by hand into positions substantially at right angles to the plane of said longitudinal members.

References Cited in the file of this patent

UNITED STATES PATENTS

| | | |
|---|---|---|
| 660,518 | Melber | Oct. 23, 1900 |
| 804,614 | Moorman et al. | Nov. 14, 1905 |
| 809,231 | Thines | Jan. 2, 1906 |
| 874,881 | Baker | Dec. 24, 1907 |
| 1,013,698 | Tashjian | Jan. 2, 1912 |
| 1,094,845 | Ellinger | Apr. 28, 1914 |
| 1,943,485 | Osborne | Jan. 16, 1934 |
| 1,962,514 | Macwilliams | June 12, 1934 |
| 2,300,181 | Spaight | Oct. 27, 1942 |
| 2,844,864 | Schilberg | July 29, 1958 |
| 2,929,238 | Kaye | Mar. 22, 1960 |
| 2,939,206 | Keller | June 7, 1960 |

FOREIGN PATENTS

| | | |
|---|---|---|
| 234,201 | Great Britain | May 28, 1925 |